(12) United States Patent
Kawasaki

(10) Patent No.: US 6,837,485 B2
(45) Date of Patent: Jan. 4, 2005

(54) FLOW QUANTITY CONTROL VALVE

(75) Inventor: Shinichi Kawasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/299,721

(22) Filed: Nov. 20, 2002

(65) Prior Publication Data

US 2003/0116743 A1 Jun. 26, 2003

(30) Foreign Application Priority Data

Dec. 21, 2001 (JP) ........................................ 2001-390177

(51) Int. Cl.$^7$ .............................................. F16K 3/24
(52) U.S. Cl. ..................................... 251/357; 137/338
(58) Field of Search ...................... 251/357; 137/338; 123/568.26, 568.29, 568.21, 568.11

(56) References Cited

U.S. PATENT DOCUMENTS

| | | | |
|---|---|---|---|
| 4,840,348 A | * | 6/1989 | Takigawa et al. .......... 251/63.6 |
| 5,494,255 A | | 2/1996 | Pearson et al. |
| 5,632,258 A | | 5/1997 | Tsuzuki et al. |
| 6,247,461 B1 | | 6/2001 | Smith et al. |

FOREIGN PATENT DOCUMENTS

| | | |
|---|---|---|
| DE | 695 01 757 T2 | 6/1994 |
| JP | 11-270417 | 5/1999 |

* cited by examiner

*Primary Examiner*—Edward K. Look
*Assistant Examiner*—John K. Fristoe, Jr.
(74) *Attorney, Agent, or Firm*—Sughrue Mion, PLLC

(57) ABSTRACT

A flow quantity control valve includes second spring holder that is fixed within housing and holds one end of valve spring which is located on a side of valve disk. The second spring holder is a roughly cylindrical member made of a material with a lower thermal conductivity than that of the housing 1 made of cast iron; and is composed of roughly circular internal bottom, stay portion that is a body portion extending from the outer periphery of the internal bottom and surrounding the valve spring, a through hole formed in a center of the internal bottom and having a larger internal diameter than the external diameter of surrounding wall constituting another through hole of the housing and flange portion radially and outwardly extending from a upper part of the stay portion and having a roughly rectangular periphery portion.

10 Claims, 5 Drawing Sheets

FLOW QUANTITY CONTROL VALVE

BACKGROUND OF THE INVENTION

1. Field of the Invention

The present invention relates to a flow quantity control valve used for such as an exhaust gas recirculation valve device controlling the flow quantity of the high-temperature exhaust gas exhausted by the internal combustion engine of an automobile, for instance.

2. Description of the Related Art

Conventionally, a variety of exhaust gas recirculation valve devices (hereinafter referred to as EGR devices) have been known. FIG. 6 is a cross sectional view to show an internal structure in the vicinity of a flow quantity control valve portion used for a conventional EGR device. In the drawing, the reference numeral 1 is a housing composed of cast iron. Inside the housing 1, there are provided a first fluid passage 2 and a second fluid passage 3 through which the high-temperature exhaust gas passes. There is provided a valve seat 4 between the first fluid passage 2 and the second fluid passage 3. Within the housing 1, there is provided a roughly cylindrical stay portion 5 closely adjacent to the second fluid passage 3. At a center of the bottom of stay portion 5, there is formed a through hole 6 which connects an inside of the stay portion 5 to an inside of the second fluid passage 3. Within the through hole 6, a valve stem 8 is provided slidably along the directions shown by the arrows A and B through the intermediary of a bearing 7. On one end of the valve stem 8, there is fixed a valve disk 9 that can engage and disengage with the valve seat 4, and on a concave portion 8a formed in a vicinity of the other end of valve stem, there is a fixed spring holder 11 through the intermediary of a bush 10. Between the spring holder 11 and an internal bottom part of the stay portion 5 of the housing 1, there is provided a valve spring 12 which energizes the valve stem 8 in the direction shown by the arrow B to engage the valve disk 9 with the valve seat 4.

On an upper edge part of the stay portion 5 of housing 1, there is fixed a driving means 13 by means of screws 14 which has a driving shaft 13a to advance the valve stem 8 in a direction shown by the arrow A against an energizing force of the valve spring 12, to thereby disengage the valve disk 9 from the valve seat 4. As for the driving means 13, for example, a DC motor, a stepping motor, a linear solenoid and the like are usually used.

In such an EGR device, when the driving shaft 13a retreats backmost position in the direction shown by the arrow B and the valve disk 9 which is fixed on the valve stem 8 engages with the valve seat 4, it is necessary that a bottom end of the driving shaft 13a of driving means 13 has properly abutted with a top end of the valve stem 8 neither too much nor too little. However in actual, when mounting the driving means 13 on the housing 1, there may be a possibility that the valve disk 9 does not abut with the valve seat 4 because of a dimensional error of the components even when the driving shaft 13a retreats backmost position. For this reason, a spacer 15 having a suitable thickness is placed between the upper edge part of the stay portion 5 of the housing 1 and the bottom end of the driving means 13, and the distance between the abutting surfaces is thereby adjusted.

The operation will next be described as below.

In the valve closing state because the driving shaft 13a of the driving means 13 retreats in the direction shown by the arrow B and the driving shaft does not thrust the valve stem 8 in the direction shown by the arrow A, the valve disk 9 is energized in the direction shown with the arrow B by the energizing force of the valve spring 12 and is engaged with the valve seat 4 (in a valve closing state). Therefore, the first fluid passage 2 is disconnected from the second fluid passage 3. Subsequently, when the valve is opened, the driving means 13 is driven to advance the driving shaft 13a in the direction shown by the arrow A and thereby the valve stem 8 is advanced to disengage the valve disk 9 from the valve seat 4 (in a valve opening state). In this valve opening state because the first fluid passage 2 is connected to the second fluid passage 3, the high-temperature exhaust gas flows from the first fluid passage 2 to the second fluid passage 3 and thereby the housing 1 constituting the second fluid passage 3 is heated up to about 350° C.

However, because the flow quantity control valve used for the conventional EGR device has an structure as described above, the valve spring 12 that is in contact directly with the housing 1 heated by the exhaust gas, is also exposed to the high temperature. For this reason, damages such as the breakage of the valve spring 12 and a reduction of the energizing force are caused. Because of the reduction of the energizing force, the valve disk 9 and the valve seat 4 disorderedly repeat the engagement and disengagement therebetween, to thereby cause abnormal sounds and the valve closing state cannot be properly maintained. As a result, there is a problem that the gas flow cannot be precisely controlled.

Moreover, in the flow quantity control valve used for the conventional EGR device, when a foreign object is caught within a coil of the valve spring 12, the caught foreign object changes the contraction and expansion stroke of the valve spring 12. As a result, there is also a problem that the valve closing state cannot be properly maintained.

By the way, Japanese Patent Laid Open Publication Hei 11-270417 discloses a flow quantity control valve having a similar structure to that of the flow quantity control valve used for the conventional EGR device shown in FIG. 6.

SUMMARY OF THE INVENTION

The present invention has been accomplished to solve the above described problems. An object of the present invention is to provide a flow quantity control valve in which its valve spring is protected from the damage caused by heat and foreign objects.

The flow quantity control valve in accordance with the present invention includes: a housing internally having at least first and second fluid passages; a valve seat provided within the housing; a valve disk provided engageably and disengageably with the valve seat; a valve stem holding the valve disk; a valve spring energizing the valve stem in a direction along which the valve disk engages with the valve seat; a driving means moving the valve stem in a direction along which the valve disk disengages the valve seat against an energizing force of the valve spring; a first spring holder fixed on the valve stem and holding one end of the valve spring; and a second spring holder fixed within the housing and holding the other end of the valve spring.

By this arrangement in accordance with the present invention, different from the conventional flow quantity control valve in which a valve spring is directly fixed within a housing, for the radiant heat from the housing a distance can be elongated and at the same time because heat is conducted via the second spring holder, the longer distance of heat conduction can be also elongated. Therefore, there is the effect that the valve spring can be protected from the damages caused by heat.

DETAILED DESCRIPTION OF THE PREFERRED EMBODIMENTS

Embodiments of the present invention will now be described in detail as below.

Embodiment 1

Figure 1:
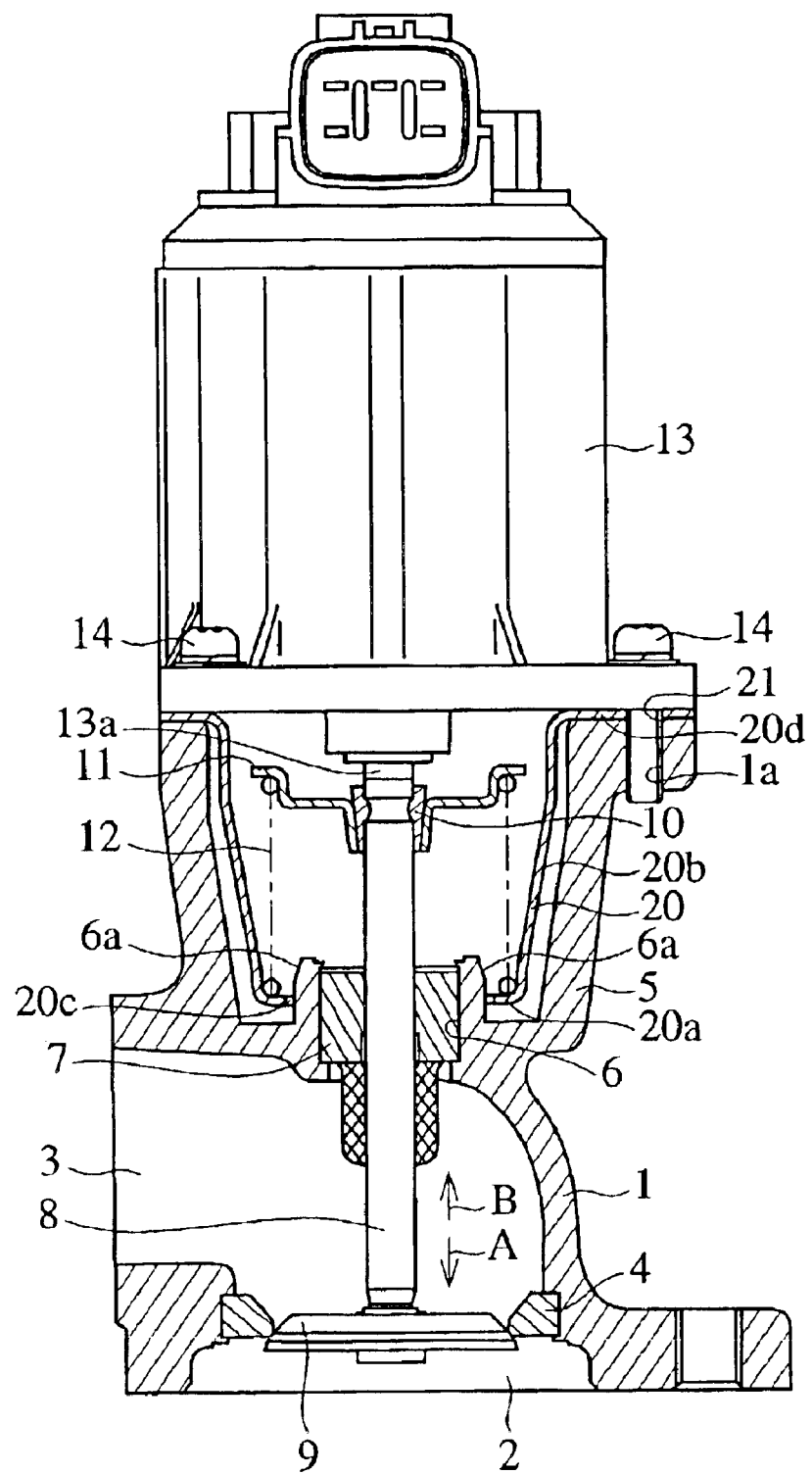
FIG. 1 is a cross sectional view to show an internal structure of a flow quantity control valve in accordance with Embodiment 1 of the present invention.
Figure 2:
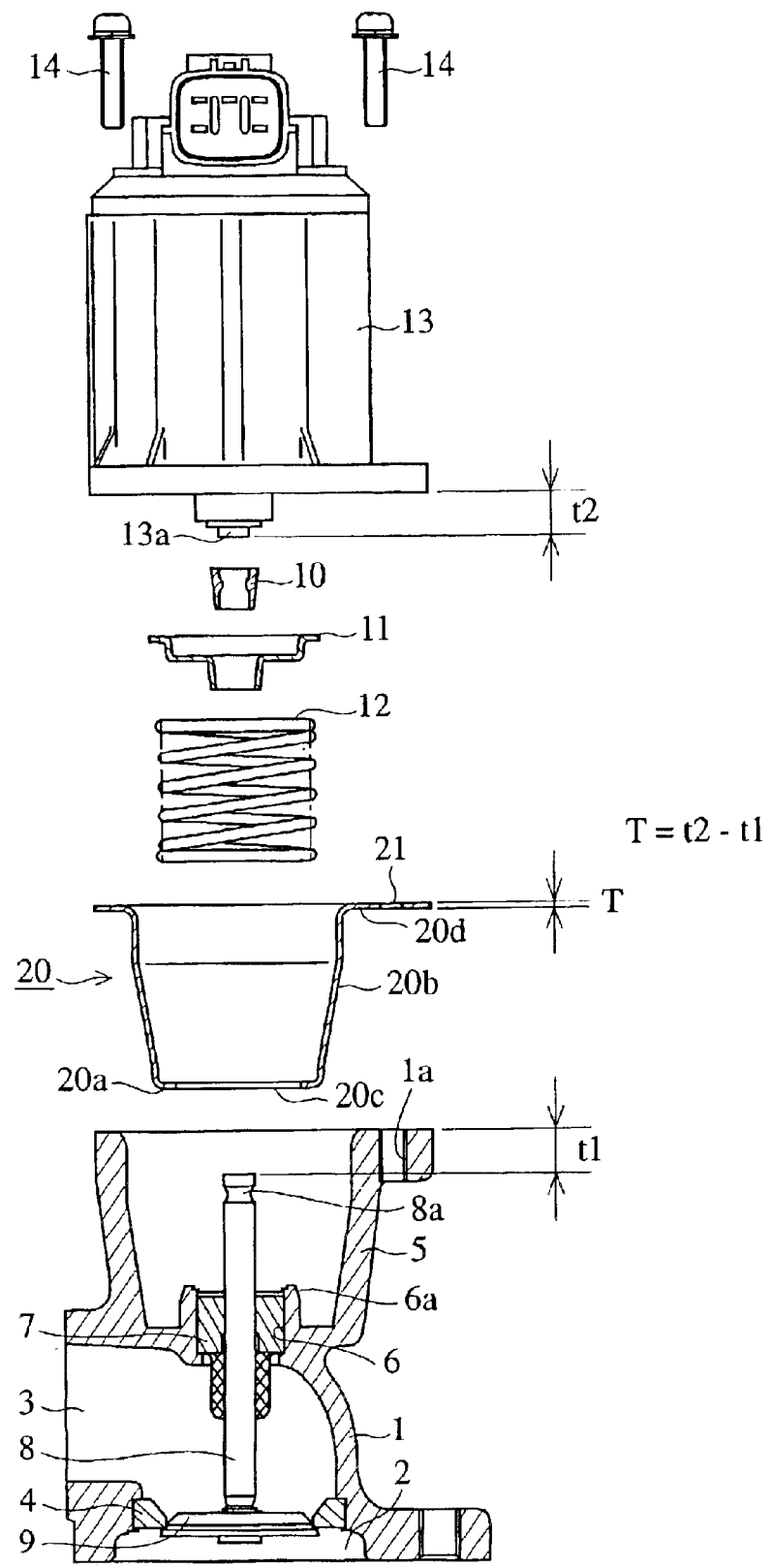
FIG. 2 is an exploded cross sectional view to show the flow quantity control valve shown in FIG. 1.
Figure 3:
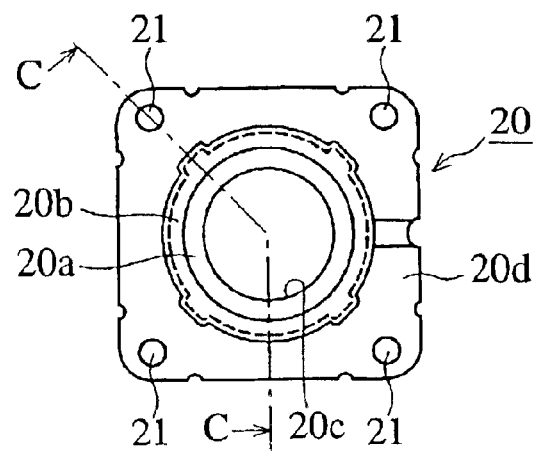
FIG. 3 is a bottom view to show a structure of the second spring holder of the flow quantity control valve shown in FIG. 1 and FIG. 2.

FIG. 1 is a cross sectional view to show an internal structure of the flow quantity control valve in accordance with Embodiment 1 of the present invention. FIG. 2 is an exploded cross sectional view to show the flow quantity control valve shown in FIG. 1. FIG. 3 is a bottom view to show the structure of a second spring holder of the flow quantity control valve shown in FIG. 1 and FIG. 2. The similar constituent elements used in Embodiment 1 which are common to the those used in the flow quantity control valve of the conventional EGR device are designated by same reference symbols and further explanations for the portions are omitted. The second spring holders of the flow quantity control valve shown in FIG. 1 and FIG. 2 are shown in a cross sectional view when it is cut along the line C—C of FIG. 3.

A feature of Embodiment 1 is that the flow quantity control valve includes a second spring holder 20 that is fixed within housing 1 and holds one end of valve spring 12 located in the side of valve disk 9, besides spring holder 11 (hereafter, referred to as a first spring holder) that is fixed on valve stem 8 and holds the other end of the valve spring 12 located in the side of driving means 13.

The second spring holder 20 is a roughly cylindrical member that is made by cupping a disk of stainless circular plate, for example, having a lower thermal conductivity than that of the housing 1 made of cast iron, by means of a deep cupping process and the second spring holder generally consists of a roughly circular internal bottom 20a, a stay portion 20b that is a body portion extending from a periphery of the internal bottom 20a and surrounding the valve spring 12, a through hole 20c formed in the center of the internal bottom 20a and having a larger internal diameter than the external diameter of a ring-shaped surrounding wall 6a constituting the through hole 6 of the housing 1, a flange portion 20d extending radially and outwardly from an upper part of the stay portion 20b and having a roughly rectangular external portion. In the predetermined positions of the flange portion 20d, there are provided a plurality of screw holes 21 through which screws 14 used for fastening the driving means 13 to the housing 1 can be inserted.

The assembling method will next be described as below.

First, the second spring holder 20 is placed within the housing 1 such that the surrounding wall 6a located within the housing 1 is inserted in the through hole 20c in a state of not contacting with the through hole. Subsequently, after disposing the valve spring 12 on the internal bottom 20a of the second spring holder 20, the valve stem 8 is inserted into the through hole 6 of the housing 1 in which bearing 7 has been inserted. Then the first spring holder 11 is fixed on concave portion 8a of the valve stem 8 through the intermediary of a bush 10. Further, after fixing the valve disk 9 on one end of the valve stem 8 in a state where the valve spring 12 is compressed by means of the first spring holder 11 and when the compressed state is released the valve disk 9 engages the valve seat 4 (in a valve closing state). After that, the driving means 13 is placed on the upper portion of the housing 1 through the intermediary of the flange portion 20d of the second spring holder 20 pinched therebetween. The screw holes 21 provided on the flange portion 20d of the second spring holder 20 are positioned with respect to the screw holes 1a of the housing 1 and the screw holes (not shown) of the driving means 13, and then the housing, the second spring holder (the flange portions) and the driving means are fastened together by means of screws 14. Thus, the assembling is completed.

Figure 6:
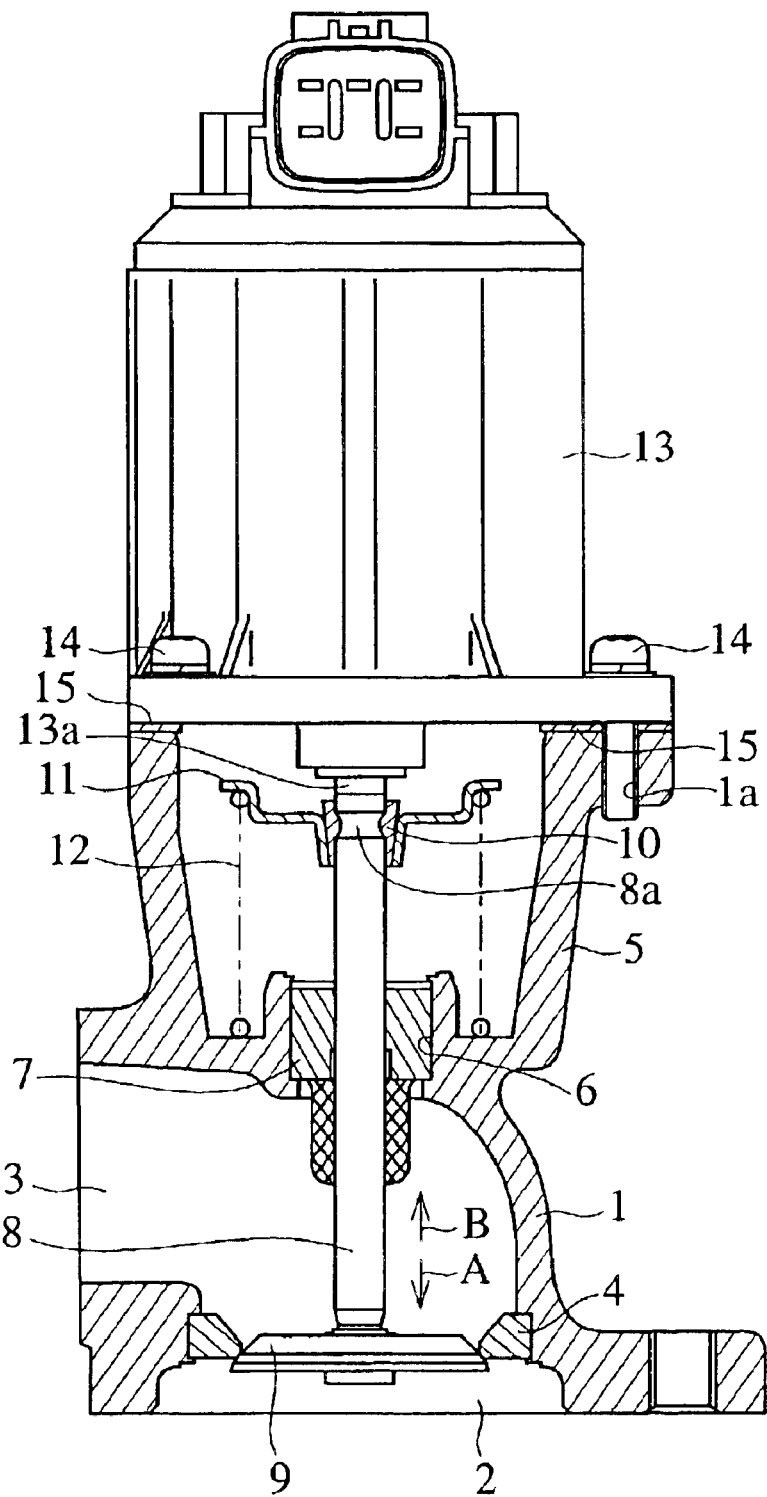
FIG. 6 is a cross sectional view to show an internal structure in the vicinity of a flow quantity control valve portion used for a conventional EGR device.

Due to the dimensional errors in the respective components shown in FIG. 2, variations of distance t1 between a top end of the housing 1 and a top end of the valve stem 8, and also of distance t2 between a bottom end of the driving means 13 and a bottom end the driving shaft 13a may occur. To adjust this trouble, in the prior art technology when assembling the components, the spacer 15 with a predetermined thickness has been placed between the housing 1 and the driving means 13 as shown in FIG. 6 to thereby adjust the dimensional errors. In this Embodiment 1 of the present invention, the flange portion 20d of the second spring holder 20 is made possible to use as a variation adjusting means in place of the above described spacer 15. At this point, the above described distances t1 and t2 are measured by means of a sensitive potentiometer and the second spring holder 20 having flange portions 20d of the thickness corresponding to T=t2−t1 (the value obtained by calculation of the measured t1 and t2) is used. Thus, the top end of the valve stem 8 and the bottom end of the driving shaft 13a of the driving means 13 can be properly engaged. Since, a selection and use of the second spring holders 20 with a variety of thickness beforehand prepared, can absorb the dimensional errors caused by the respective parts and it can eliminate a need of additional preparation of the spacer 15. Of course, it is also possible to use the flange portion 20d of the second spring holder 20 together with the above described spacer 15 at the same time.

The operation will next be described as below.

In the valve closing state because the driving shaft 13a of the driving means 13 retreats in the direction shown by the arrow B and it does not thrust the valve stem 8 in the direction shown by the arrow A, the valve disk 9 is energized in the direction shown by the arrow B with the energizing force of the valve spring 12 to thereby engage with the valve seat 4 (in the valve closing state). Therefore, the first fluid passage 2 is disconnected from the second fluid passage 3. Subsequently, when the valve is opened, the driving means 13 is driven to advance the driving shaft 13a in the direction shown by the arrow A and thereby the valve stem 8 is advanced to disengage the valve disk 9 from the valve seat 4 (in the valve opening state). In this valve opening state because the first fluid passage 2 is connected to the second fluid passage 3, the high-temperature exhaust gas flows from the first fluid passage 2 to the second fluid passage 3 and thereby the housing 1 within which the second fluid passage 3 is provided is heated up to about 350° C.

However, in Embodiment 1, the flow quantity control valve is different from the conventional one in the structure, that is to say because the valve spring 12 is not contacted directly with housing 1 and the valve spring 12 is separated from the housing 1 through the intermediary of the second spring holder 20, the heat is hardly transferred to the valve spring 12 from a side of the housing 1. This is because, in relation to the radiant heat from the side of the housing 1, a distance is made increased when compared with the case of the conventional structure and in relation to the conductive heat from the side of the housing 1, the distance of heat conduction is made increased by means that the heat is conducted from the stay portion 5 of the housing 1 to the valve spring 12 via the flange portion 20*d*, the stay portion 20*b* and the internal bottom 20*a* of the second spring holder 20. Therefore because the valve spring 12 is less exposed to the high temperature when compared with that of the conventional EGR device, damages such as breakage of the valve spring 12 and the deterioration of the energizing force can be prevented and at the same time the emission of the abnormal sounds caused by disordered repetition of the engagement and disengagement between the valve disk 9 and the valve seat 4 can be properly prevented. Moreover because the spring characteristics of the valve spring 12 does not reduce, the valve closing state can surely be maintained and at the same time the flow quantity of the fluid can be accurately controlled by the reliable opening and closing operation.

As described above in accordance with Embodiment 1 because the valve spring 12 is fixed within the housing 1 through the intermediary of the second spring holder 20, different from the conventional case in which the valve spring 12 is directly fixed within the housing 1, the distance from the housing 1 can be increased for the radiant heat and at the same time the distance of heat conduction can also be increased with the heat passing through the second spring holder 20. As a result, there is an effect that the valve spring can be protected from the harmful effects caused by the heat.

In Embodiment 1 because the second spring holder 20 is made of stainless steel having a lower thermal conductivity than that of the housing 1, it is made possible to reduce the conductive heat from the housing 1 heated by the high temperature exhaust gas to the valve spring 12. As a result, there is an effect that the valve spring 12 can be protected from the harmful effects caused by the heat.

In Embodiment 1 because the second spring holder 20 is arranged to include the flange portion 20*d* having a function of the spacer 15 serving as a variation adjusting means for a spacing distance, there is the effect that the use of the dedicated spacer 15 can be abolished or reduced.

In Embodiment 1 because the flow quantity control valve is arranged such that the valve spring 12 is surrounded with the stay portion 20*b* of the second spring holder 20, the valve spring 12 can be protected from foreign objects. Thereby, there is the effect that the expansion and contraction stroke of the valve spring 12 is not fluctuated; the valve closing state is reliably maintained; and at the same time the flow quantity of the fluid can be accurately controlled by means of the reliable opening and closing operation.

At this point in Embodiment 1 the flow quantity control valve is arranged such that the end of the valve spring 12 which is located on the side of the driving means 13 is held by means of the first spring holder 11 and the end of the valve spring 12 which is located on the side of the valve disk 9 is held by means of the second spring holder 20. However, there can be attained also the same effect when the flow quantity control valve is arranged such that the end of the valve spring 12 which is located on the side of the driving means 13 is held by means of the second spring holder 20 and the end of the valve spring 12 which is located on the side of the valve disk 9 is held by means of the first spring holder 11.

Embodiment 2

Figure 4:
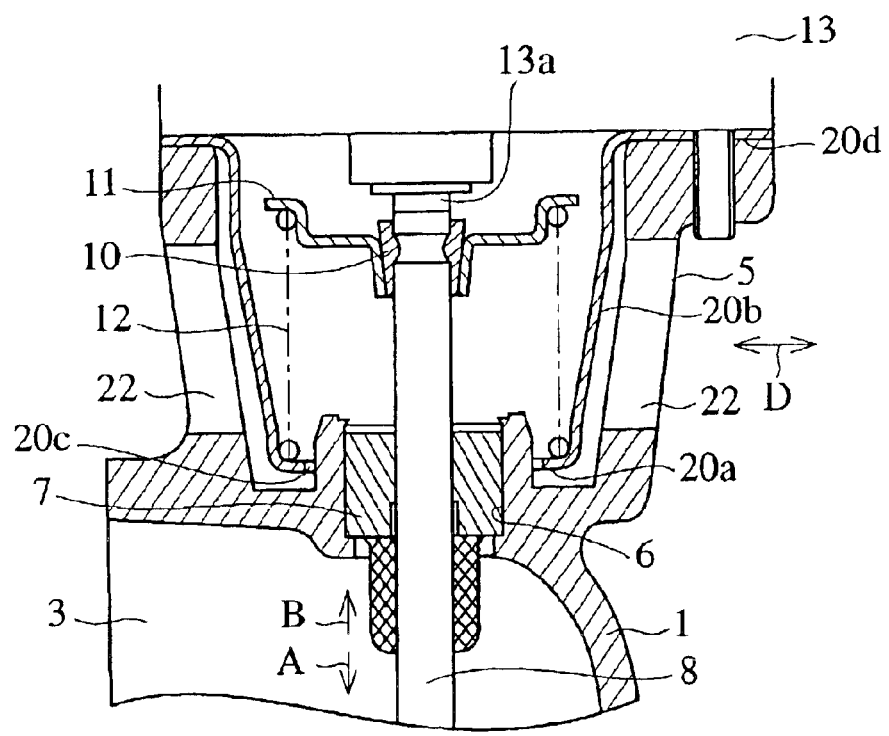
FIG. 4 is a cross sectional view to show an internal structure of the relevant portion of a flow quantity control valve in accordance with Embodiment 2 of the present invention.

FIG. 4 is a cross sectional view to show an internal structure of the relevant portion of a flow quantity control valve in accordance with Embodiment 2 of the present invention. The similar constituent elements used in Embodiment 2 which are common to those used in the flow quantity control valve of the conventional EGR device and in Embodiment 1 are designated by the same reference symbols and further explanations for the portions are omitted.

A feature of Embodiment 2 is that, in addition to the structure of Embodiment 1, a through hole 22 is provided within the stay portion 5 of the housing 1. The through hole 22 is used to ventilate the second spring holder 20 from the outside, to thereby cool second spring holder 20 and the valve spring 12. Moreover, when the flow quantity control valve in accordance with Embodiment 2 is installed within the internal combustion engine or the like by regarding a direction shown by the arrow D in FIG. 4 as the vertical direction, the through hole 22 also serves as a drainer for efficiently draining droplets outside such as water droplets containing sulfuric acid that are formed when the high-temperature exhaust gas is cooled and condensed on the external surface of the second spring holder 20 and harmfully influence the driving means 13. In addition, the through hole 22 is formed only in a portion facing onto the second spring holder 20. Therefore, the valve spring 12 is not exposed outside through the through hole 22. Accordingly, the function of the second spring holder 20 such as the function of preventing the valve spring 12 from foreign objects is not damaged and can be maintained.

The operation will next be described as below.

In the valve closing state because the driving shaft 13*a* of the driving means 13 retreats in the direction shown by the arrow B and it does not thrust the valve stem 8 in the direction shown by the arrow A, the valve disk 9 is energized in the direction shown by the arrow B by the energizing force of the valve spring 12 to thereby engage with the valve seat 4 (in the valve closing state). Therefore, the first fluid passage 2 is disconnected from the second fluid passage 3. Subsequently, when the valve is opened, the driving means 13 is driven to advance the driving shaft 13*a* in the direction shown by the arrow A and thereby the valve stem 8 is advanced to disengage the valve disk 9 from the valve seat 4 (in the valve opening state). In this valve opening state because the first fluid passage 2 is connected to the second fluid passage 3, the high-temperature exhaust gas flows from the first fluid passage 2 to the second fluid passage 3 and thereby the housing 1 within which the second fluid passage 3 is provided is heated up to about 350° C.

The radiant heat from the housing 1 is transmitted from the vicinity of the surrounding wall 6*a* toward the internal bottom 20*a* of the second spring holder 20. The conductive heat is transmitted via the stay portion 5 of the housing 1 and the flange portion 20*d* of the second spring holder 20.

However, because a path of the heat conduction is made elongated in comparison with the case of the conventional structure, the temperature rise in the valve spring 12 is suppressed. In addition, the valve spring 12 is cooled through the intermediary of the second spring holder 20 by the air flowing into the stay portion 5 of the housing 1 through the through hole 22 opened to face to the second spring holder 20.

As described above in accordance with Embodiment 2 because the flow quantity control valve is arranged such that the through hole 22 is provided in the stay portion 5 of the housing 1, in addition of the effect obtained in Embodiment 1 the flow quantity control valve can efficiently drain the droplets outside condensed on the external surface of the second spring holder 20. Accordingly, there is the effect that the valve spring 12 and the driving means 13 can be reliably protected from damages caused by droplets such as water containing sulfuric acid or the like.

Embodiment 3

Figure 5:
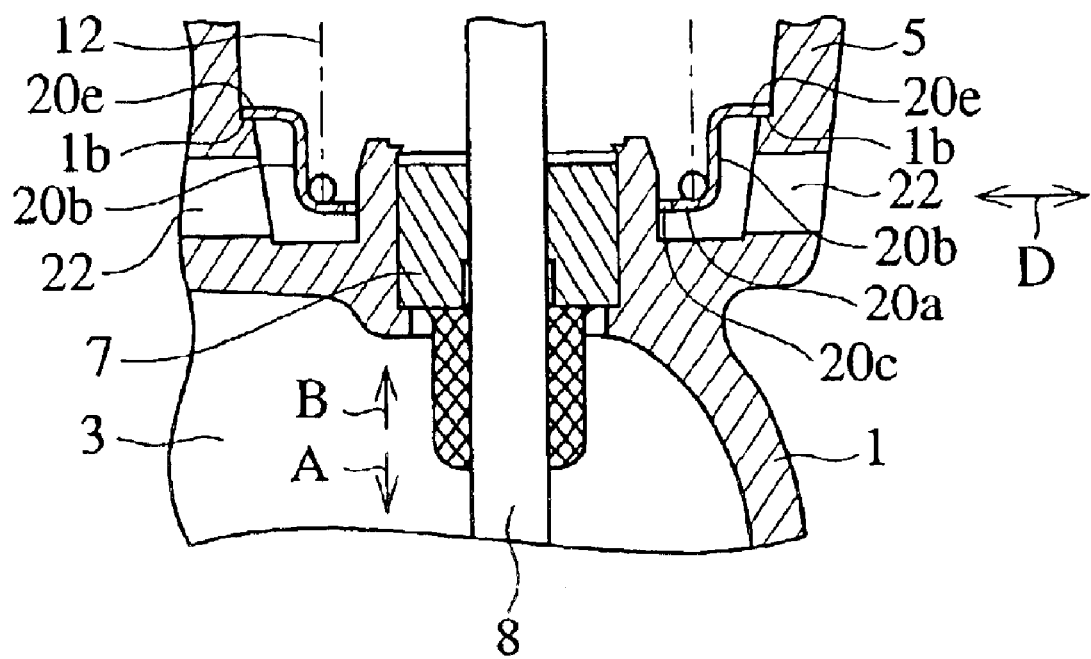
FIG. 5 is a cross sectional view to show an internal structure of the relevant portion of a flow quantity control valve in accordance with Embodiment 3 of the present invention.

FIG. 5 is a cross sectional view to show an internal structure of the relevant portion of a flow quantity control valve in accordance with Embodiment 3 of the present invention. The similar constituent elements used in Embodiment 3 which are common to those used in the flow quantity control valve of the conventional EGR device and in Embodiment 1 are designated by the same reference symbols and further explanations of the portions are omitted.

A feature of Embodiment 3 is that the flow quantity control valve is arranged such that a step portion 1b extending in the circumferential direction on the inner wall of the stay portion 5 of the housing 1 is provided; a flange portion 20e of a small second spring holder 20 having a shortened stay portion 20b is fit into this step portion 1b; and a through hole 22 is provided on a side which the valve seat 4 belongs with reference to the step portion 1b in the stay portion 5 of housing 1 as shown in FIG. 5. Though the flange portion 20e radially and outwardly extends from the top end part of the stay portion 20b similarly as the flange portion 20d of Embodiment 1 and Embodiment 2 , the periphery portion of the flange portion 20e is formed in a roughly circular shape in order to fit the step portion 1b of the housing 1 different from the flange portions 20d used in Embodiment 1 and Embodiment 2. In this Embodiment 3 in order to correspond to the small second spring holder 20, the through hole 22 is made such that an open area is smaller than that of the through hole used in Embodiment 2. That is to say, in this Embodiment 3, the second spring holder 20 does not have the function of variation adjusting for the distance that the second spring holders 20 has in Embodiment 1 and Embodiment 2, but the second spring holder 20 has only the function of protecting the valve spring 12 from the damage caused by the heat and foreign objects.

The operation will next be described as below.

In the valve closing state because the driving shaft 13a of the driving means 13 retreats in the direction shown by the arrow B and does not thrust the valve stem 8 in the direction shown by the arrow A, the valve disk 9 is energized in the direction shown by the arrow B by the energizing force of the valve spring 12 to thereby engage with the valve seat 4 (in the valve closing state). Therefore, the first fluid passage 2 is disconnected from the second fluid passage 3. Subsequently, when the valve is opened, the driving means 13 is driven to advance the driving shaft 13a in the direction shown by the arrow A and thereby the valve stem 8 is advanced to disengage the valve disk 9 from the valve seat 4 (in the valve opening state). In this valve opening state because the first fluid passage 2 is connected to the second fluid passage 3, the high-temperature exhaust gas flows from the first fluid passage 2 to the second fluid passage 3 and thereby the housing 1 within which the second fluid passage 3 is provided is heated up to about 350° C.

The radiant heat from the housing 1 is transmitted from the vicinity of the surrounding wall 6a toward the internal bottom 20a of the second spring holder 20. The conductive heat is transmitted via the stay portion 5 of the housing 1, the step portion 1b of the stay portion and the flange portion 20e of the second spring holder 20. However, because a path of heat conduction is elongated compared with that in the conventional structure, the temperature rise in the valve spring 12 is suppressed. In addition, the valve spring 12 is cooled through the intermediary of the second spring holder 20 by the air flowing in the stay portion 5 of the housing 1 through the through hole 22 opened to face to the second spring holder 20.

As described above, in accordance with Embodiment 3 because the flow quantity control valve is arranged such that the step portion 1b holding the flange portion 20e of the small second spring holder 20 having the shortened stay portion 20b, is provided within housing 1, even the small second spring holder 20 can sufficiently protect the valve spring 12 from the damage caused by the heat. Additionally because the flow quantity control valve is arranged such the through hole 22 is provided on a side which the valve seat 4 belongs with reference to the step portion 1b in the stay portion 5 of housing 1, there is the effect that the valve spring 12 can be protected from foreign objects.

In this Embodiment 3 because the second spring holder 20 is formed in a simpler shape than that of the second spring holder used in Embodiment 1 and Embodiment 2, there is the effect that the larger reductions in cost can be achieved compared with the case of Embodiment 1 and Embodiment 2 as the flow quantity control valve does not need a cost rise caused by the deep cupping process.

In Embodiment 3 because a path of the heat conduction is shorter than the path in Embodiment 1 and Embodiment 2, it is preferable to apply Embodiment 3 to a valve spring 12 which has enough capacity for resisting heat.

What is claimed is:

1. A flow quantity control valve comprising:
   a housing internally comprising a first fluid passage and a second fluid passage;
   a valve seat within the housing;
   a valve disk provided engageably and disengageably with the valve seat;
   a valve stem holding the valve disk;
   a valve spring energizing the valve stem in a direction along which the valve disk engages with the valve seat;
   a driving means for moving the valve stem in a direction along which the valve disk disengages from the valve seat against an energizing force of the valve spring;
   a first spring holder fixed on the valve stem and holding a first end of the valve spring; and
   a second spring holder fixed within the housing and holding a second end of the valve spring,
   wherein the second spring holder is a substantially cylindrical element comprising a circular bottom and a stay portion extending from the periphery of the circular bottom, and
   wherein the stay portion surrounds the valve spring.

2. The flow quantity control valve according to claim 1, wherein the second spring holder is made of a material with a lower thermal conductivity than that of a material constituting the housing.

3. The flow quantity control valve according to claim 2, wherein the second spring holder has a flange portion pinched between the housing and the driving means.

4. The flow quantity control valve according to claim 3, wherein the housing includes a housing stay portion having a through hole connecting the second spring holder to ambient air.

5. The flow quantity control valve according to claim 1, the housing further comprising a housing stay portion comprising:
- a step portion to hold a flange portion of the second spring holder, and
- a through hole connecting the second spring holder to ambient air.

6. The flow quantity control valve according to claim 1, wherein the stay portion surrounds the valve spring in a complete manner along the entire axial length of the valve spring.

7. A flow quantity control valve comprising:
- a housing internally having a first fluid passage and a second fluid passage;
- a valve seat provided within the housing;
- a valve disk provided engageably and disengageably with the valve seat;
- a valve stem holding the valve disk;
- a valve spring energizing the valve stem in a direction along which the valve disk engages with the valve seat;
- a driving means for moving the valve stem in a direction along which the valve disk disengages the valve seat against an energizing force of the valve spring;
- a first spring holder fixed on the valve stem and holding a first end of the valve spring; and
- a second spring holder fixed within the housing and holding a second end of the valve spring, wherein the second spring holder is made of a material with a lower the thermal conductivity than that of a material constituting the housing.

8. The flow quantity control valve according to claim 7, wherein the second spring holder has a flange portion pinched between the housing and the driving means.

9. The flow quantity control valve according to claim 7, wherein the second spring holder has a stay portion surrounding the valve spring.

10. The flow quantity control valve according to claim 9, wherein the housing includes a stay portion having a through hole connecting the second spring holder to ambient air.

* * * * *